United States Patent
Ito

[11] Patent Number: 5,147,989
[45] Date of Patent: Sep. 15, 1992

[54] ROTARY POSITION DETECTOR

[75] Inventor: Humio Ito, Yabuzuka, Japan

[73] Assignee: Mitsuba Electric Manufacturing Co., Ltd., Gunma, Japan

[21] Appl. No.: 509,994

[22] Filed: Apr. 16, 1990

[30] Foreign Application Priority Data

Apr. 17, 1989 [JP] Japan ................. 1-44920[U]

[51] Int. Cl.$^5$ ............... H01H 43/00; B60J 7/02
[52] U.S. Cl. ................. 200/11 R; 200/19 R
[58] Field of Search ............ 200/11 R, 179, 19 R, 200/19

[56] References Cited

U.S. PATENT DOCUMENTS

4,652,947 3/1987 Oka et al. .................. 360/85
4,700,026 10/1987 Kamiyama et al. ........... 200/19 R Primary Examiner—Howard L. Williams
Assistant Examiner—D. Le
Attorney, Agent, or Firm—Rodman & Rodman

[57] ABSTRACT

A detector for detecting a revolution number of an output shaft of a sun-roof driving device of a motor vehicle as a rotary position. This rotary position detector comprises: a rotary disk rotatable in association with the output shaft as being a rotator to be detected; a plurality of guide grooves formed concentrically with the rotary center of the rotary disk and connected to each other by connection grooves; a contact plate opposed to this guide groove; a slider provided on a surface of one end of this contact plate and movable along the guide groove in accordance with the rotation of the rotary disk; a pair of contact points provided at a surface on an end opposite to the slider of the contact plate; a conductive plate, on which the contact points selectively slide, to perform switching; and a device for detecting a position of the contact plate due to the movement of the slider.

14 Claims, 5 Drawing Sheets

ROTARY POSITION DETECTOR

BACKGROUND OF THE INVENTION

Field of the Invention

This invention relates to a rotary position detector, more particularly to techniques of detecting a rotary position which indicates a revolution number of a rotator rotatable in a plurality of times, and further, relates to a rotary position detector effective, for example, for being utilized in detecting a revolution number of an output shaft of a sun-roof driving device mounted onto a motor vehicle.

In order to automatically operate the sun-roof driving device mounted onto the motor vehicle, it is necessary to detect a number of revolution of an output shaft from a home position thereof.

As a rotary position detector for detecting the revolution number of the output shaft of the sun-roof driving device, such an arrangement has heretofore been adopted that a cam is operationally associated with the output shaft through an intermittent operation mechanism or a reduction mechanism, a plurality of limit switches are arranged at an interval around the cam in the circumferential direction,.positions of the cam in one rotation are detected by the respective limit switches, so that the revolution number of the output shaft having rotated a plurality of times can be detected.

However, with the above-described rotary position detector, the intermittent operation mechanism or the reduction mechanism for greatly reducing the plurality of rotation of the output shaft to one rotation involves a complicated construction, and further, use of the plurality of limit switches of high price leads to increase in cost.

SUMMARY OF THE INVENTION

It is an object of the present invention to provide a rotary position detector being simplified in the construction and capable of reducing the cost.

The rotary position detector according to the present invention comprises:

a rotary disk rotatable in association with a rotator to be detected;

a guide track constructed such that a plurality of annular tracks arranged concentrically with the rotary center of the rotary disk at an end surface of the rotary disk are connected to each other by connection tracks laid in the radial direction between annular tracks adjoining each other in the radial direction;

a plate opposed to the guide track and at least a portion of which is movable in the radial direction;

a slider integrally movable with the plate and movable in the guide track in association with the rotation of the rotary plate; and a means for detecting a position of movement of the plate in accordance with the movement of the slider.

In the above-described rotary position detector, the plurality of annular tracks each may have cutaway portions, and, between the cutaway portions of the annular grooves adjoining each other in the radial direction out of the annular grooves, the connection grooves are formed in the radial direction so as to connect the annular grooves to each other.

In the above-described rotary position detector, out of the plurality of annular tracks, the innermost annular track and the outermost annular track may have endless grooves respectively connecting the innermost and outermost annular grooves in endless shapes.

In the above-described rotary position detection, the endless grooves may be formed at the portions corresponding respectively to the portions of the cutaway portions provided at portions of the annular tracks, and the endless grooves each have a surface inclined in the circumferential direction.

In the above-described rotary position detector, the rotary position detector may have a cam gear, an output shaft of the driving device may have a spur gear, and the cam gear and the spur gear are relatively shifted in position so as to be in mesh with each other and associated with each other so as to transmit a driving force to each other.

In the above-described rotary position detector, a case including a-body and a lid member may be provided, and a pivot for the plate may be inserted into the lid member in the axial direction thereof at a position shifted from the rotary center of the rotary disk.

In the above-described rotary position detector, the plate may be a contact plate provided at one end portion thereof on the side of the guide track with the slider and at the other end portion thereof on a surface opposite to the slider with a pair of contact points, and the pair of contact points se come in contact with a plurality of conductive plates.

In the above-described rotary position detector, the pair of contact points may be spaced apart from each other in the radial direction of the contact plate, and a surrounding portion of a contact point disposed inwardly in the radial direction out of the pair of contact points may be punched in a substantially U-shape.

In the above-described rotary position detector, the plurality of conductive plates may be provided on the inner side surface of the lid member in association with sliding tracks of the pair of contact points, each of the conductive plates is connected to a controller portion of a driving device, and both or one of the pair of contact points comes selectively in contact with at least one of the conductive plates to perform switching of an electric circuit, whereby a rotary position is detected.

In the above-described rotary position detector, the case may be provided with a rotation presence detector for detecting the presence of rotation of the rotary disk, and the rotation presence detector includes: a pair of contact plates; a first and a second contact points provided on a free end portion of each of the contact plates; and conductive plates in sliding contact with the contact points.

As the rotary disk rotates, the slider moves relatively, being guided along the guide track, and when the slider is transferred from one of the annular tracks to the other, which are adjoining each other in the radial direction, through the connecting track, the plate fixed thereto with the slider is moved intermittently by one pitch. Since this intermittent movement of the plate by one pitch corresponds to one rotation of the rotary disk, the revolution number corresponding to the rotary position of the rotary disk can be detected by detecting the number of the pitches of the intermittent movement of the pitches of the intermittent movement of the plate.

BRIEF DESCRIPTION OF THE DRAWINGS

The above and other objects and features of the present invention will become more apparent when referred to the following description given in conjunction with the accompanying drawings, wherein like reference numerals denote like elements, and in which.

DETAILED DESCRIPTION OF THE EMBODIMENT

In an embodiment of the invention, as shown in FIGS. 1-9 the rotary position detector is of such an arrangement that, in order to detect the open-close position of the sun-roof provided on a motor vehicle, a detection is made on the revolution number corresponding to a rotary position from the initial state of an output shaft in the sun-roof driving device for driving the sun-roof, and the detector is optionally assembled to the output shaft of the sun-roof driving device therearound. The sun-roof driving device is installed in the vicinity of a window hole, not shown, formed in a roof of the motor vehicle, and adapted to slidably drive a sun-roof, not shown, slidably built in the window hole to open or close the window hole through a sliding cable, not shown.

Figure 1:
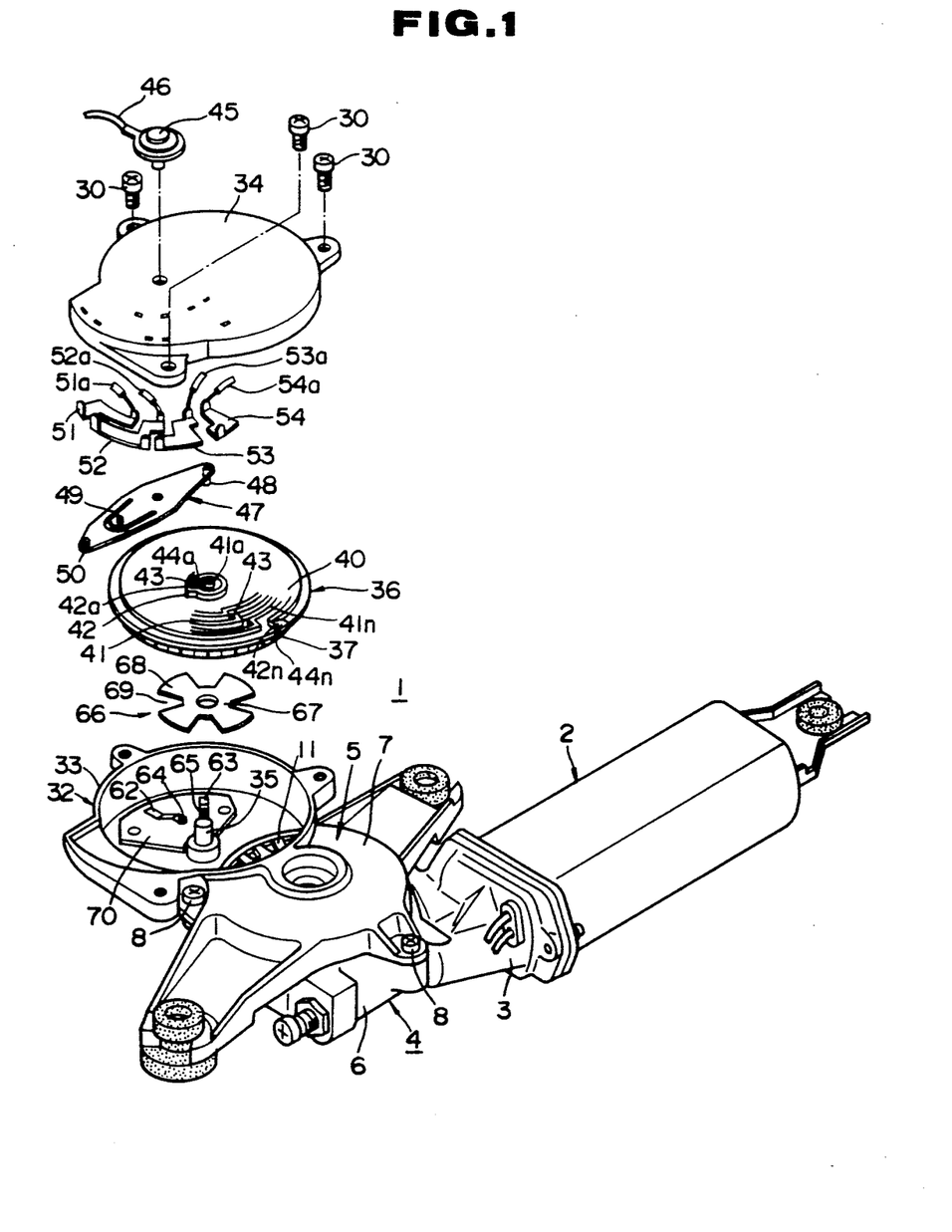
FIG. 1 is a disassembled perspective view showing the sun-roof driving device provided with the rotary position detector embodying the present invention.
Figure 2:
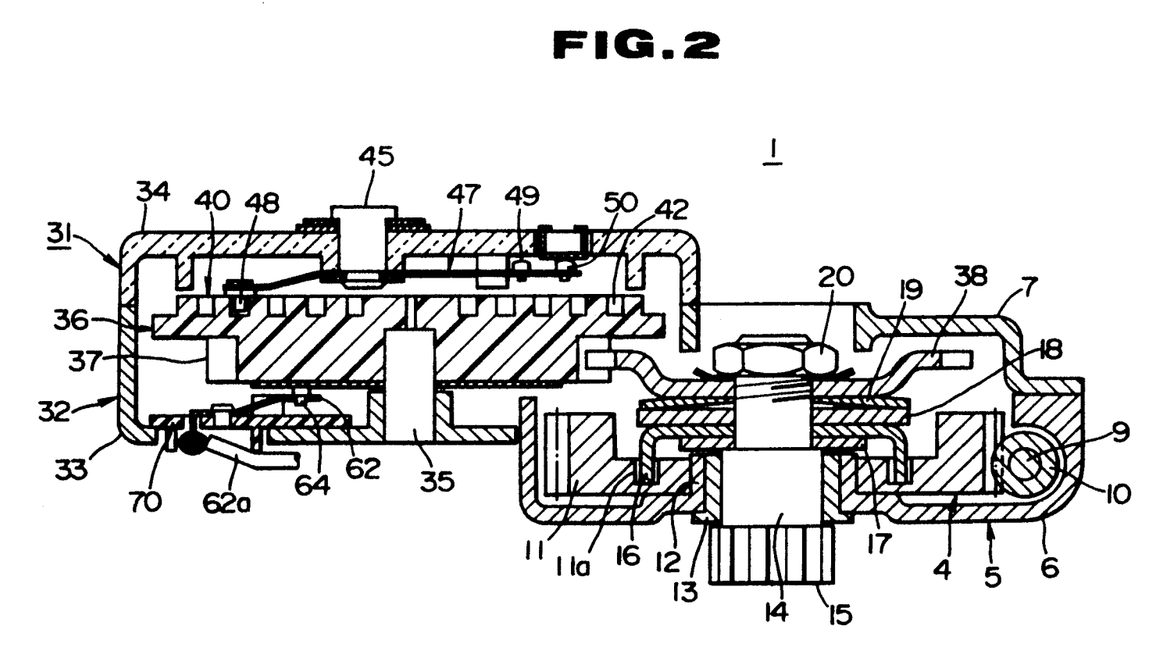
FIG. 2 is a longitudinal sectional view including the rotary position detector.

Referring now to FIG. 1, the sun-roof driving, device 1 is provided with a motor 2 rotatable in the normal or reverse direction, and a worm reduction device 4 is additionally provided at an end portion of the output shaft of the motor 2 with a gear box thereof being fixedly assembled to an end portion of a motor frame 3. The gear box 5 includes a body 6 and a lid member 7, the body 6 is fixedly assembled to the motor frame 3, and the lid member 7 covers an end surface (hereinafter referred to as a "top surface") of the body 6 and is detachably fixed thereto through a plurality of screws 8. Referring to FIG. 2, a worm shaft 9 of the worm reduction device 4, which is rotatably supported by the body 6, is inserted into the gear box 5, and this worm shaft 9 is rotatably drove by a rotary shaft, not shown, of the motor 2. A worm 10 is cuttingly provided on the worm shaft 9, and a worm wheel 11 is in mesh with the worm 10 in a manner to be reduced in rotation. The worm wheel 11 is coupled to a bearing portion 12 formed at the central portion of the body 6 in the gear box 5 to thereby be supported rotatably.

An output shaft 14 of the sun-roof driving device 1 is provided in the gear box 5 of the worm reduction device 4 along the axial line of the worm wheel 11, and the output shaft 14 is rotatably supported by a bearing metal 13 coupled into the inner periphery of the bearing portion 12 of the body 6. .A bottom end portion of the output shaft 14 projects outward from an end face wall of the body 6, and a cable driving gear 15 is integrally formed on the projecting end portion of this output shaft 14. This cable driving gear 15 straightly, reciprocatorily moves a sliding cable, not shown, connected to the sun-roof, to thereby open or close the sun-roof.

A clutch plate 16 is rotatably coupled to an intermediate portion of the output shaft 14 in a manner to be opposed to an end face of the worm wheel 11, and the clutch plate 16 is engaged with an engageable hole 11a of the worm wheel 11 in a manner to rotate integrally with the worm wheel 11. A washer 17 and a frictional disk 18 are abutted against opposite sides of the clutch plate 16, and a leaf spring 19 is installed on the output shaft 14 in a manner to be abutted against the frictional disk 18 on the side opposite to the worm wheel 11. The leaf spring 19, is pressed by a nut 20 threadably coupled to a top end portion of the output shaft 14 through a spur gear to be described hereunder, and adapted to press the clutch plate 16 against the output shaft 14, taking a reaction force from the output shaft 14. By this, a turning force of the worm wheel 11 is transmitted to the output shaft 14 through the clutch plate 16, and, if the output shaft 14 is locked, then the clutch plate 16 rotates idly about the output shaft 14, so that the worm reduction device 4 and the motor 2 can be protected from damages.

A rotary position detector 31 is optionally assembled to the gear box 5 of the reduction device 4. Namely, the rotary position detector 31 has a case 32 including a body 33 and a lid member 34, the body 33 is formed to provide a short length cylindrical shape, in which the top face is open and the bottom face is closed, and provided additionally, integrally on the lid member 7 as shown in FIG. 1 of the gear box 5, and is fixed to the body 6 of the gear box 5 together with the lid member 7. The lid member 34 is made of resin or the like, formed to provide a short length cylindrical shape, in which the bottom face is open and the top face is closed, the lid member 34 covers the body 33 and is detachably fixed thereto through screws 30. A pivot 35 is fixed in the case 32 on the center line of the body 33, and a rotary disk 36 is concentrically coupled onto the pivot 35 and rotatably supported thereby. A cam gear 37 is formed in the lower half of the rotary disk 36 and is integrally rotated therewith, and this cam gear 37 is in mesh with a spur gear 38 clamped between the leaf spring 19 and the nut 20 of the output shaft 14.

Figure 3:
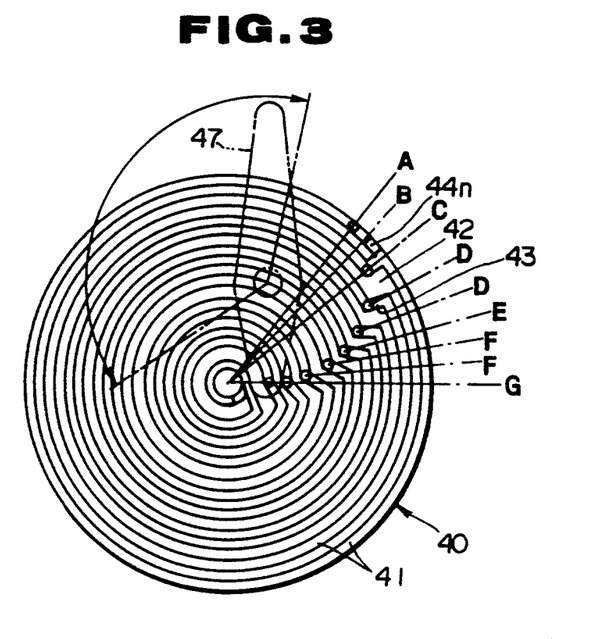
FIG. 3 is a typified plan view showing the rotary disk.

A guide groove 40 as being a guide track is formed serially on the top end surface of the rotary disk 36. The guide groove 40 includes an annular groove with a cutaway portion as being a partially cutaway annular track and a connection groove as being a connection track. As shown in FIG. 3, a plurality of annular grooves 41 are provided concentrically with the rotary center of the rotary disk 36, recessed to a given depth and a given width, and partially provided with cutaway portions 42. A connection groove 43 extends in the radial direction between the cutaway portions 42, 42 of the annular grooves 41, 41 adjoining each other in the radial direction so as to connect the both annular grooves 41, 41 to each other, is recessed to the same depth and to the same width with the annular groove 41, and accordingly, the guide groove 40 is formed to provide a serial spiral shape. A group of the connection grooves 42 and a group of the cutaway portions 42 provided respectively between the annular grooves 41, 41 are disposed in a manner to be arranged on a circular arcuate line in the radial direction of the rotary disk 36, and this circular arcuate line is set at a curvature substantially corresponding to a rotary radius of a .. contact plate to be described hereunder. Furthermore, as shown in FIG. 1, endless grooves 44a, 44n are formed in cut-away portions 42a, 42n of an innermost annular groove 41a and an outermost annular groove 41n so as to respectively connect the annular grooves 41a and 41n in endless shapes, and these endless grooves 44a, 44n are formed on a circumferentially suitably inclined surface.

On the other hand, referring again to FIG. 2, a pivot 45 is disposed on the lid member 34 of the case 32 in a manner to be opposed to a position shifted from the rotary center on the top surface of the rotary disk 36, inserted into the lid member 34 in a direction of the axis, and a lead line 46 is electrically connected to the pivot 45 outside the lid member 34 as shown in FIG. 1. This lead line 46 is electrically connected to an input terminal of a controller, not shown, of the sun-roof driving device. Detailed description is omitted though, the controller is constituted by a microcomputer or the like, and displays the action to be described hereunder.

Figure 4:
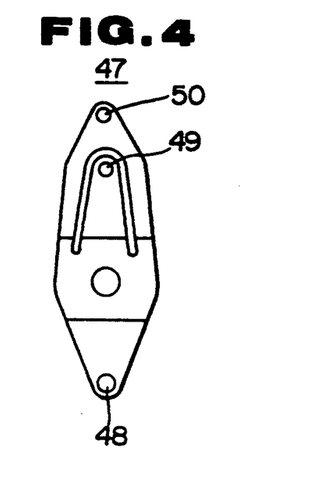
FIG. 4 is a plan view showing a contact plate.

A contact plate 47, a portion of which moves i the radial direction, is disposed in parallel with the top surface of the rotary disk 36 at an end portion of the pivot 45 inserted into the case 32, an intermediate portion of the contact plate is coupled to the pivot 45 so as to be rotatably supported. The contact plate 47 is made of a resilient conductive material such as a copper material and pressed into a boat shape of a thin plate as shown in FIG. 4. A slider 48 having a stepped columnar shape is inserted vertically, downwardly into a free end portion at one side of the contact plate 47 and fixed thereto, and the slider 48 is inserted slidably into the aforesaid guide groove 40 recessedly formed on the top surface of the rotary disk 36 from above as shown in FIG. 2. Namely, the contact plate 47 slides relatively with the guide groove 40 as the rotary disk 36 rotates, and rotates intermittently every time the slider 48 changes the annular groove 41 of the guide groove 40 to one disposed inside or outside in the vertical direction. A pair of contact points 49, 50, which are apart from each other in the radial direction, are vertically, upwardly inserted into a free end portion a the other side of the contact plate 47 and fixed thereto, and both the contact points 49, 50 are adapted to slide on relay plates to be described hereunder.

Out of these contact points 49 and 50, a surrounding portion of the contact point 49 disposed inwardly in the radial direction is partially punched in a substantially U-shape as shown in FIG. 4, so that the contact point 49 is provided with a resilient action.

As shown in FIG. 1, a first relay plate 52, a third relay plate 53 and a fourth relay plate 54 are fixed to the ceiling surface of the lid member 34 of the case 32 in association with circular arcuate tracks of the both contact points 49, 50. The respective relay plates 51-54 are made of a wear-resistant conductive material such as copper material, formed to provide a shape shown in FIG. 5, disposed so as to display the switching action to be described hereunder, and electrically connected to the input terminal of the controller of the sun-roof driving device through lead wires 51a-54a.

Figure 6:
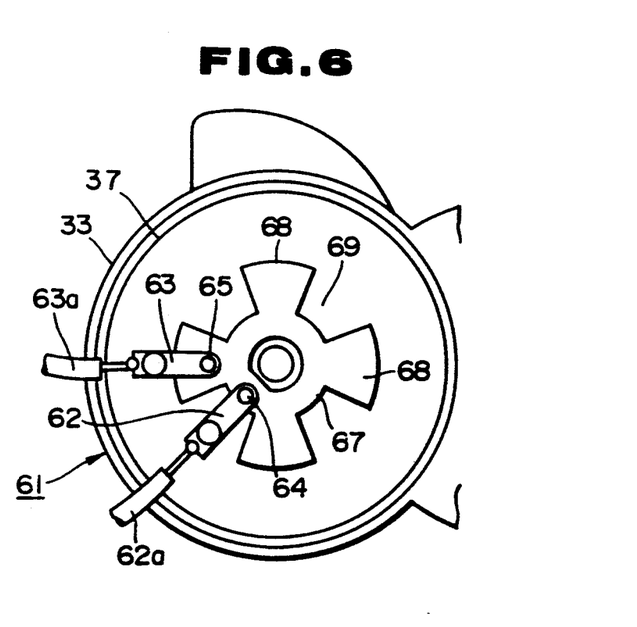
FIG. 6 is a bottom view showing a rotation presence detector.

Furthermore, a rotation presence detector 61 is provided in the case 32 as shown in FIG. 6. Namely, a pair of contact plates 62, 63 are slightly apart from each other in the radial direction, clamped by an insulating plate 70 and fixed to the bottom wall of the body 33 of the case 32, and lead lines 62a, 63a re electrically connected to the both contact plates 62, 63, respectively, at the outside of the case 32. The both lead lines 62a, 63a are electrically connected to the controller of the sun-roof driving device. Contact points 64, 65 are vertically, upwardly inserted into free end portions of the both contact plates 62, 63 and fixed thereto, and the both contact points 64, 65 slide on a relay plate 66 secured to the bottom surface of the cam gear 37. This relay plate 66 is made of a wear-resistant conductive material such as a copper material, and formed to provide a shape having an inner ring shape portion 67 and an outer cross shape portion 68 as shown in FIG. 6. The first contact point 64 is in association with a circular track in constant sliding contact with the ring shaped portion 67, and the second contact point 65 is in association with a circular track in sliding contact with the cross shaped portion 68 and a non-conductive portion 69 formed between the cross shape portions.

The rotation presence detector 61 detects that the rotary disk 36 is in the rotating condition when on-off condition is continued to be interchanged between the first and second contact points 64 and 65 through the relay plate 66, and detects that the rotary disk 36 is not in the rotating condition when on-condition or off-condition is maintained.

Action will hereunder be described.

Figure 5:
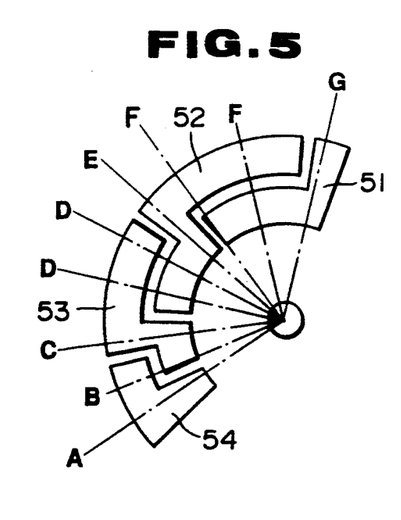
FIG. 5 is a typified plan view showing a conductive plate.
Figure 7:
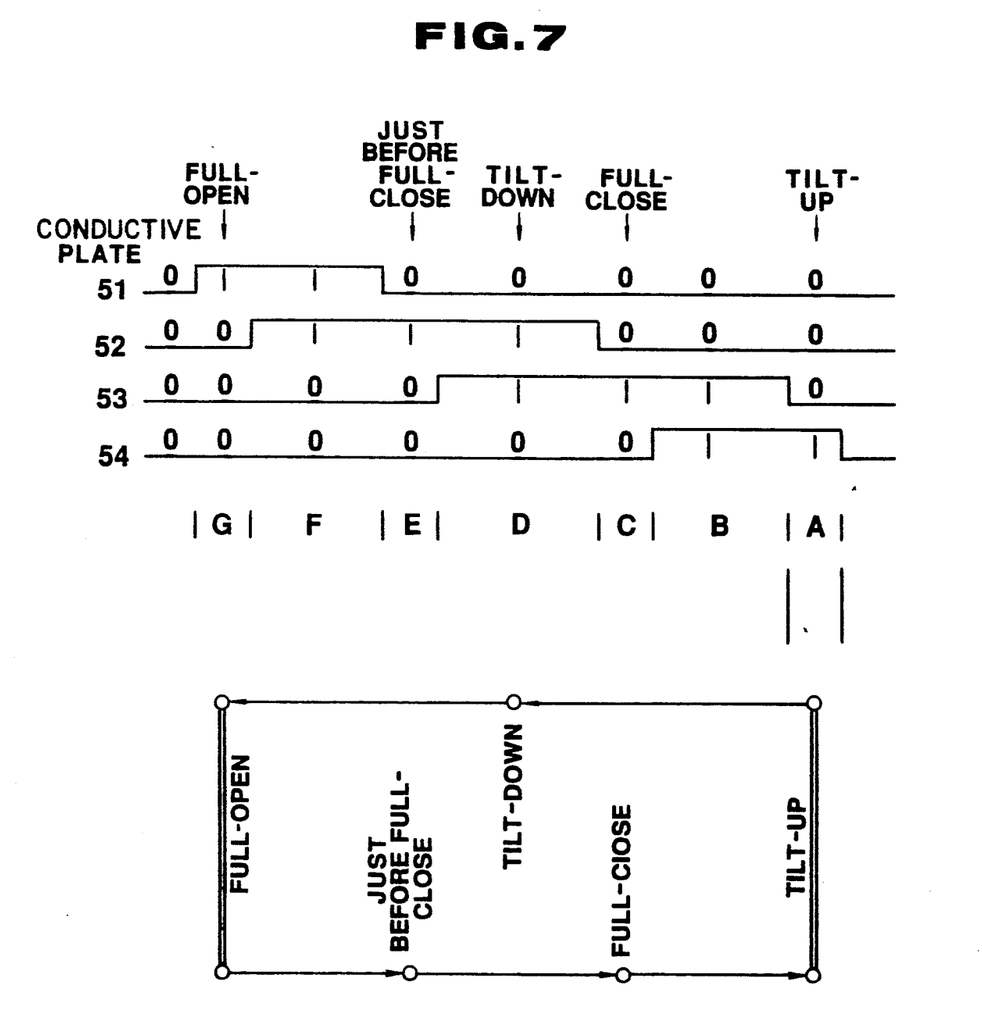
FIG. 7 is a view in explanation of the action of the sun-roof driving device.

Firstly, when the slider 48 of the contact plate 47 is positioned in the outermost annular groove 41n of the guide groove 40, the sun-roof driven by the sun-roof driving device 1 is supposed to be in the tilt-up state as shown in FIG. 7. At this time, as shown in FIG. 5, the both contact points 49, 50 of the contact plate 47 are in a position A in contact with the fourth relay plate 54.

When a switch included in an electric circuit, not shown, for driving the motor 2 of the sun-roof driving device 1 is operated by a driver of the vehicle in a direction of full-open, the output shaft 14 is rotated in the normal direction by the motor 2 through the worm shaft 90, the worm 10, the worm wheel 11 and the clutch plate 16. Due to this rotation of the output shaft 14 in the normal direction, the sliding cable is slidably drove by the gear 15 in the normal direction, whereby the sun-roof begins to operate to reach the tilt-down condition, first.

On the other hand, when the output shaft 14 is rotated in the normal direction, the spur gear 38 is rotated integrally with the output shaft 14, so that the rotary disk 36 is rotated in the normal direction through the cam gear 37 meshingly engaged with the spur gear 38. As the rotary disk 36 rotates, the slider 48 relatively slides in the guide groove 36.

Then, when the rotary disk 36 makes one turn, the slider 48 is transferred from the outermost annular groove 41n to the annular groove 41, which is positioned inside the annular groove 41n, through the connection groove 43.

Since this transfer of the slider 48 is performed by one pitch movement from the outside of the inside in the radial direction, the contact plate 47 formed integrally with the slider 48 is intermittently rotated about the pivot 45 by one pitch. Further, when the rotary disk 36 makes one turn, the slider 48 is transferred to a further inner annular groove 41 by one pitch, whereby the contact plate 47 is intermittently rotated further by one pitch.

When the pair of contact points 49, 50 reach a position C where these contact points are brought into contact the third relay plate 53 simultaneously due to the intermittent rotation of the contact plate 47 caused by the rotation of the rotary disk 36 as shown in FIG. 5, a detection signal is inputted to the controller of the sun-roof driving device 1. Namely, when current passes through the lead line 45, pivot 45, contact plate 47, contact points 49, 50, and third relay plate 53, to lead line 53a, a signal C is inputted into the controller on the basis of the position of the third relay plate 53 as shown in FIG. 7.

When the switch is turned on continuously, the motor 2 is rotated continuously, whereby the rotary disk 36 is further rotated. When, due to the turning of the contact plate 47 caused by the rotation of the rotary disk 36, the contact points 49, 50 reach a position D where the contact points 49, 50 come in contact with the second relay plate 52 and the third relay plate 53 as shown in FIG. 5, current is passed through the lead line 46, pivot 45, contact plate 47, contact point 49, and second relay plate 52 to lead line 52a, and through the lead line 46, pivot 45, contact plate 47, contact point 50, and third relay plate 53 to lead line 53a, whereby the controller detects that the sun-roof is in the tilt-down condition on the basis of the positional relationship between the second and the third relay plates 52 and 53 as shown in FIG. 7. Then, the controller automatically stops the motor 2 on the basis of this detection, even when the switch is continuously turned on.

When the switch is turned on again, the both contact points 49, 50 reach a position G where the both contact points come in contact with the first relay plate 51 due to the turning of the contact plate 47 caused by the rotation of the rotary disk 36 as shown in FIG. 5, the controller detects that the sun-roof in the full-open condition on the basis of the position of the first relay plate 51 as shown in FIG. 7. Then, the controller automatically stops the motor 2 on the basis of this detection, even when the switch is turned on continuously.

Thereafter, when the switch is operated in a direction of tilt-up in the case where the sun-roof is in the full-open condition, the output shaft 14 is rotated in the reverse direction by the motor 2 through the worm shaft 9, the worm 10, the worm wheel 11 and the clutch plate 16. Due to this rotation of the output shaft 14 in the reverse direction, the sliding cable is slidably drove in the reverse direction by the gear 15, whereby the sun-roof begins to be closed.

On the other hand, when the output shaft 14 is rotated in the reverse direction, the spur gear 38 is rotated integrally with the output shaft 14, whereby the rotary disk 36 is rotated in the reverse direction through the cam gear 37. As the rotary disk 36 rotates, the slider relatively slides in the guide groove 40 in a direction reverse to the above.

At this time, each time the rotary disk 36 makes one turn, the slider 48 successively moves from the inner annular groove 41a to the outer annular groove 41 by one pitch, whereby the contact plate 47 intermittently rotates by one pitch in a direction reverse to the above.

When the both contact points 49, 50 reach a position E where the both contact points simultaneously come in contact with the second relay plate 52 due to the turning of the contact plate 47 caused by the rotation of the rotary disk 36 as shown in FIG. 5, the controller detects that the sun-roof reaches a condition just before full-close on the basis of the position of the second relay plate 52. On the basis of this detection, the controller automatically stops the motor 2 in order to prevent the sun-roof from causing a clamp-in accident and the like.

When the switch is operated again by the driver in the direction of tilt-up, the motor is rotated again. Then, a signal of C is inputted into the controller and the condition of full-close is detected as shown in FIG. 7. By this detection, the motor 2 is automatically stopped. Further, the switch is operated by the driver in the direction of tilt-up, whereby the signal A is inputted into the controller and the motor is automatically stopped, so that the sun-roof reaches the condition of tilt-up. This condition of tilt-up is a condition where the sun-roof is inclined to be raised in the backward direction and the window hole is slightly open, so that air is suitably taken in when a vehicle moves at high speed.

In this condition of tilt-up, the contact plate 47 is returned to the initial position A where the both contact points 49, 50 are simultaneously in contact with the fourth relay plate 54.

Now, in the sun-roof driving device, in order to meet the requirement of the diversification of the types, the type not automatically operating is demanded. In this case, assembly of the rotary position detector is not required. However, if the sun-roof driving device integrally built therein with the rotary position detector and the sun-roof driving device not built therein with the rotary position detector are manufactured from the beginning, then the requirement for the diversification can be met, but, the reduction in production cost cannot be expected, and on the contrary, the production cost tends to be increased.

Figures 8, 9:
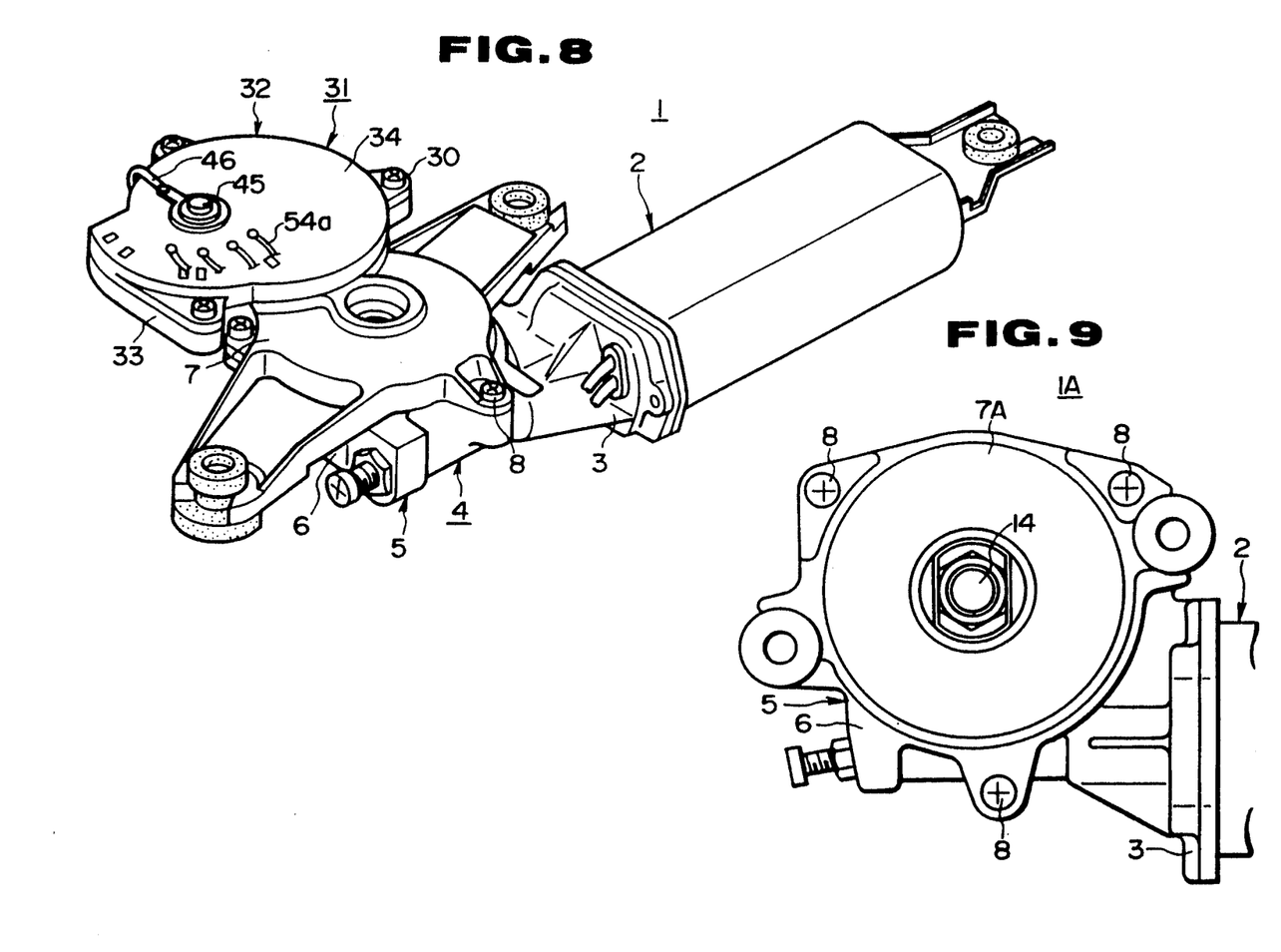
FIG. 8 is a perspective view of outer appearance showing the sun-roof driving device provided with the rotary position detector.
FIG. 9 is a partial plan view showing the sun-roof driving device with the rotary position detector removed therefrom.

Then, in this embodiment, the case body 32 of the rotary position detector 31 is integrally formed on the lid member 7 of the gear box 5 containing the worm reduction device 4, this lid member 7 is removed from the body 6 of the gear box 5, and a separately prepared lid member 7A not built therein with the rotary position detector 31 is assembled thereto, so that the sun-roof driving device 1A having no rotary position detector can be obtained as shown in FIG. 9.

Namely, as shown in FIG. 8, in the sun-roof driving device 1 having the rotary position detector, the lid member 7 integrally built therein with the rotary position detector 31 is assembled to the body 6 of the gear box of the worm reduction device 4 through the screws 8. Accordingly, the lid member 7 is removable from the body 6 of the gear box by loosening the screws 8.

As shown in FIG. 9, no rotary position detector 31 is assembled to the lid member 7A used in the sun-roof driving device 1A having no rotary position detector. In short, this lid member 7A is not integrally formed with the case body 33 of the rotary position detector 31 and formed into a shape which can cover the body 6 of the gear box of the worm reduction device 31. This lid member 7A is assembled to the body 6 of the gear box through the screws 8 before the lid member 7 with the rotary position detector is assembled thereto.

As described above, in this embodiment, the motor 2 and the worm reduction device 4 can be commonly used between the sun-roof driving device 1 having the rotary position detector and the sun-roof driving device 1 having no rotary position detector, so that the production cost can be reduced. Furthermore, the rotary position detector 31 can be independently manufactured on a line separate from the assembly process of the sun-roof driving device 1, so that the processes of manufacture can be rationalized.

The following advantages can be attained by the above embodiment.

(1) The guide groove consisting of the plurality of partially cutaway annular grooves and the connection grooves, which are formed on the rotary disk, are combined with the contact plate having the slider relatively slidable in the guide groove, whereby one rotation of the rotary disk can be changed into one pitch turn of the contact plate, so that the rotation of the output shaft as being the rotator to be detected can do without reducing in speed or rotating intermittently to one turn as in the example of the prior art, with the result that, in the rotary position detector, the intermittent rotation mechanism or the reduction mechanism in the rotary position detector can be dispensed with, thus simplifying the construction and achieving the decreased cost.

(2) The plurality of annular grooves having the cutaway portions are arranged concentrically with one another and the annular grooves adjoining each other in the radial direction at the cutaway portions are connected to each other through the connection groove, whereby the guide groove is formed, so that the contact plate can be turned by one pitch intermittently and positively.

(3) By the above-described (2), the change-over position of the contact plate in association with each of the connection grooves can be made clear, so that the detection positions by the group of the relay plates can be easily set and the design can be simplified.

(4) Even if idle running occurs during the stopping of the motor, the slider merely moves relatively in the same annular groove, so that unexpected turning of the contact plate can be prevented, thus avoiding the occurrence of a mistake in the detection of a position due to the idle running.

(5) The unexpected turning of the contact plate is thus prevented, so that occurrence of chattering phenomenon between the contact points and the relay plates can be prevented.

(6) Since the case body of the rotary position detector is formed integrally on the lid member of the gear box containing the worm reduction device and this lid member is removable from the body of the gear box, whereby, if the lid member not built therein with the rotary position detector is prepared separately, then this lid member can be assembled to the body of the gear box, so that the motor and the worm reduction device can be commonly used between the sun-roof driving device having the rotary position detector and the sun-roof driving device having no rotary position detector, thereby meeting the requirement of diversification of the types and reducing the production cost as a whole.

Incidentally, the present invention should not necessarily be limited to the above embodiment, and various modification can be adopted within the scope of the invention.

For example, the rotary disk associated with the rotator to be detected should not necessarily be associated with the spur gear and the cam gear, and may be formed integrally on the rotator to be detected.

The guide track should not necessarily be formed of the guide groove, and such an arrangement may be adopted that the guide track is formed of a raised portion and the slider may stride over the raised portion.

The plate moving in the radial direction should not necessarily be arranged such that the plate is rotatably supported to move from the outside to the inside in the vertical direction, and such an arrangement may be adopted that the plate is slidably coupled to the guide extended from the outside to the inside in the radial direction, whereby the plate moves in the guide from the outside to the inside in the radial direction.

The plate should not necessarily be formed of the contact plate and the means for detecting the rotary position of the plate should not necessarily be the combining between the contact point fixed to the contact plate and the relay plate.

The number of the partially cutaway annular tracks, number of the connection tracks, number of the plates and number of the means for detecting the transferred position of the plates may be suitably set in accordance with the conditions to be detected.

As has been described hereinabove, according to the present invention, the guide track constituted by the plurality of partially cutaway annular tracks and the connection tracks, all of which are formed on the rotary disk, is combined with plate provided with the slider relatively slidable on this guide track, whereby one turn of the rotary disk can be changed to one pitch movement of the plate, whereby the rotation of the rotator to be detected can do without reducing in speed or rotating intermittently to one turn as in the example of the prior art, with the result that the intermittent mechanism or the reduction in the rotary position detector can be dispensed with, so that the construction can be simplified and the decreased cost can be achieved.

What is claimed is:

1. A rotary position detector comprising:
   a rotary disk rotatable in association with a rotator to be detected;
   a guide track constructed such that a plurality of annular tracks arranged at an upper surface of the rotary disk concentrically with a rotary center of the rotary disk are connected to each other by connection tracks laid in the radial direction between the annular tracks adjoining each other in the radial direction;
   a plate opposed to said guide track, which is provided with a slider movable outwardly and inwardly in the radial direction being guided along said guide track in association with the rotation of said rotary disk; and
   a means for detecting a portion of movement of said plate in accordance with the movement of said slider.

2. The rotary position detector as set forth in claim 1, wherein:
   said plurality of annular tracks are annular grooves and connecting grooves and said connecting tracks are connecting grooves formed in a radial direction so as to connect the annular grooves.

3. The rotary position detector as set forth in claim 2 wherein:
   said connection, tracks are each-arranged on a line of movement of said plate in the radial direction of said rotary disk.

4. The rotary position detector as set forth in claim 1, wherein:
   said plurality of annular attacks, include an innermost annular track and outermost annular track with endless grooves connecting said innermost and outermost annular tracks respectively in endless shapes.

5. The rotary position detector as set forth in claim 4, wherein:
   said endless grooves are respectively formed as cutaway portions in said annular tracks, and said endless grooves each have a surface inclined in a circumferential direction.

6. The rotary position detector as set forth in claim 1, wherein:
said rotary position detector is additionally, integrally formed on a lid member of a gear box of a driving device.

7. The rotary position detector as set forth in claim 6, wherein:
said rotary position detector has a cam gear; an output shaft of said driving device has a spur gear; and said cam gear and said spur gear are relatively shifted in position so as to be in mesh with each other and associated with each other so as to transmit a driving force to each other.

8. The rotary position detector as set forth in claim 1, wherein:
a case comprising a body and a lid member is provided, and a pivot is inserted into said lid member in the axial direction thereof at a position shifted from the rotary center of the rotary disk.

9. The rotary position detector as set forth in claim 8, wherein:
said plate is a contact plate provided at one end portion thereof on the side of said guide track with the slider and at the other end portion thereof on aside opposite to the slider with a pair of contact points, and said pair of contact points selectively come in contact with a plurality of conductive plates.

10. The rotary position detector as set forth in claim 9, wherein:
said pair of contact points are spaced apart from each other in the radial direction of said contact plate, and a portion surrounding the contact point disposed inwardly in the radial direction out of said pair of contact points is punched in a substantially U-shape.

11. The rotary position detector as set forth in claim 9, wherein:
the contact plate is formed of an electrically conductive material, at least, from a portion where said pivot is inserted, to a portion where said pair of contact points are provided.

12. The rotating position detector as set forth in claim 9, wherein:
said plurality of conductive plates re provided on the inner side surface of said lid member in association with sliding tracks of said pair of contact points, each of the conductive plates is connected to a controller portion of a driving device, and both or one of said pair of contact points comes selectively in contact with at least one of said conductive plates to perform switching of an electric circuit, whereby a rotary position is detected.

13. The rotary position detector as set forth in claim 8, wherein:
said case is provided with a rotation presence detector for detecting the presence of rotation of said rotary disk, and said rotation presence detector includes: a pair of contact plates; a first and a second contact points provided on a free end portion of each of said contact plates; and conductive plates in sliding contact with said contact points.

14. The rotary position detector as set forth in claim 13, wherein;
said rotation presence detector detects that said rotary disk is in the rotating condition when on-off conditions are recurringly interchanged between a first contact point and a second contact point through said conductive plate, and detects that said rotary disk is not in the rotating condition when on-condition or off-condition is maintained.

* * * * *